S. JACOBSEN.
APPARATUS FOR MEASURING FABRICS AND THE LIKE.
APPLICATION FILED OCT. 29, 1907.

944,870.  Patented Dec. 28, 1909.

Witnesses:  Inventor
  Severin Jacobsen
  By Wm. E. Boulter,
    attorney

UNITED STATES PATENT OFFICE.

SEVERIN JACOBSEN, OF CHRISTIANIA, NORWAY.

APPARATUS FOR MEASURING FABRICS AND THE LIKE.

944,870.  Specification of Letters Patent.  Patented Dec. 28, 1909.

Application filed October 29, 1907. Serial No. 399,724.

*To all whom it may concern:*

Be it known that I, SEVERIN JACOBSEN, a subject of the King of Norway, residing at Christiania, Norway, have invented certain new and useful Improvements in Apparatus for Measuring Fabrics and the Like; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My invention relates to an apparatus for measuring the length of rolls of fabrics, etc., and has for its object to enable the measuring to be performed without unfolding the rolls.

In measuring fabrics and the like folded up in rolls it has hitherto been necessary first to unfold the roll and then after the measuring has been performed, to fold it up again. Special devices have been proposed in order to enable the measuring to be performed without dismounting the rolls from the shelves; the measuring of the fabric by means of such apparatus has been performed in the manner that a cord or tape by a suitable guiding means has been worked round between the successive folds of the roll beginning at one of its ends and following each winding of the fabric.

My invention has for its object certain arrangements for making such apparatus more fit for practical use. This I obtain, for instance, by arranging automatic measuring means and the cord reel in a common casing, which also serves as a handle for the apparatus.

Figure 1:
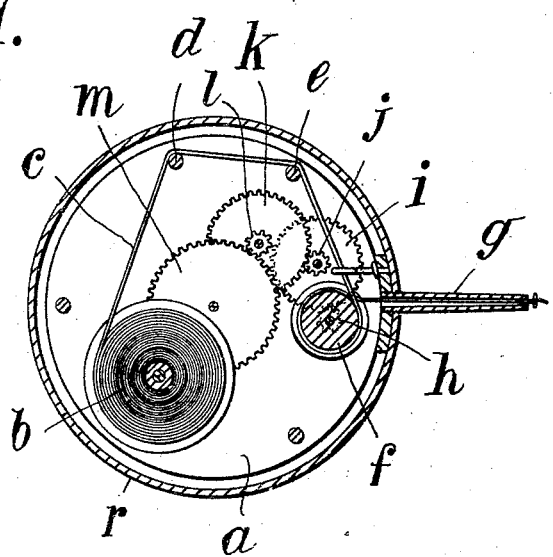
Figure 2:
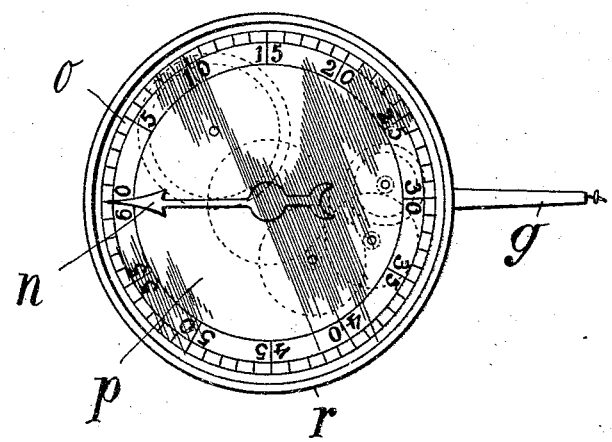

In the accompanying drawings, which illustrate a preferred constructional form of an apparatus, embodying my invention: Figure 1 is a horizontal section and Fig. 2 is a plan view of the apparatus.

$a$ is a frame, which carries a reel $b$ for the cord $c$, which cord or tape is carried over guiding pins $d$, $e$ to a measuring drum $f$, around which the thread has been laid. From said measuring drum the cord is carried through a projecting straight tubular guidepiece $g$. The drum $f$ moves through the gear wheels $h$, $i$, $j$, $k$, $l$, $m$ a hand $n$, mounted on a plate $o$ with a scale from which the length of the cord running out from the reel $b$ can be seen. The said hand and scale can be observed through the glass $p$ of the casing $r$. I prefer to arrange the measuring drum and the cord reel at one side of a partition and the gear wheels at the other side of such partition.

When the apparatus is to be used, the end of the cord is placed at the outer end of the fabric roll, and the guide tube $g$, through which the cord runs, is led along between the windings or folds of the roll, until the inner end of the fabric has been reached. The length of the cord run out from the reel can then be read directly from the scale.

Claim.

In an apparatus of the character described the combination with a casing, a frame mounted therein, and a scale plate carried by the frame of a reel $b$ and a drum $f$ mounted on the frame, a cord-guide $g$ carried by the casing, a measuring cord passing through the said guide and passing around the drum $f$ and reel $b$, an indicating hand movably arranged over the scale-plate, and gearing between the said drum $f$ and the indicating hand.

In testimony that I claim the foregoing as my invention, I have signed my name in presence of two subscribing witnesses.

SEVERIN JACOBSEN.

Witnesses:
 HENRY BORDEWICH,
 MICHAEL ALGER.